Sept. 18, 1951  M. J. BUMP  2,568,317
DENTAL SPONGE APPLICATOR
Filed Nov. 26, 1949

INVENTOR.
MONROE J. BUMP

BY Fay, Golrick & Fay

ATTORNEYS

Patented Sept. 18, 1951

2,568,317

UNITED STATES PATENT OFFICE 2,568,317

DENTAL SPONGE APPLICATOR

Monroe J. Bump, Parma, Ohio

Application November 26, 1949, Serial No. 129,542

4 Claims. (Cl. 32—35)

This invention relates to improvements in dental apparatus and more particularly to retention implements used in the mouth of the patient during dental operations upon the teeth located in the lower jaw.

The general object of the invention is the provision of a lingual bilateral sponge retention appliance so constructed that the sponges will be maintained in such position as to afford complete visibility of the tops and inner sides of the teeth and, while thus maintaining the sponges, to act thereon in such manner as to obtain sufficient depressing of the muscles of the floor of the mouth to permit lingual cavity preparation without danger of cutting the tongue or lingual muscles.

A more specific object is the provision of an appliance of the character above referred to which will be reliable in construction and function while being of such proportions as to permit of its being placed and retained beneath the tongue of the patient without irritation and discomfort.

A further object of the invention is the provision of an appliance for the foregoing stated purposes and which can be sterilized repeatedly without deterioration.

Other objects and advantages of the invention will be apparent from the following detailed description of preferred forms of embodiment of the invention, reference being made to the accompanying drawings wherein—

Figure 7:
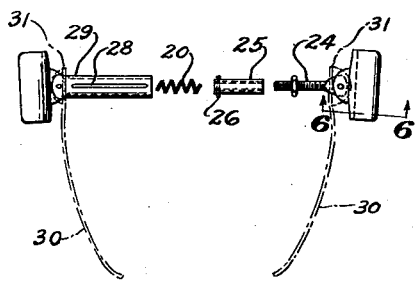
Fig. 7 is a modified form of the invention and also showing a still further modification indicated by the dot and dash lines.
Figure 4:
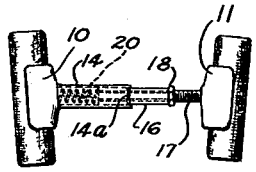
Fig. 4 is a plan view of the appliance and the sponges held thereby when prepared for insertion in the mouth of the patient.
Figure 1:
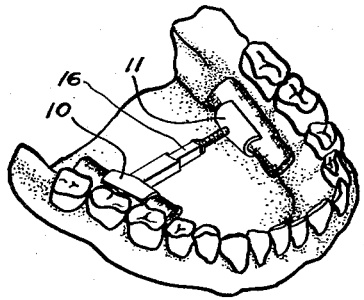
Fig. 1 is a perspective more or less diagrammatic view of a lower jaw showing an embodiment of my invention bilaterally retaining two sponges in place.
Figure 5:
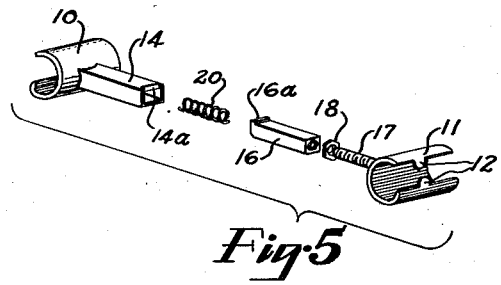
Fig. 5 is an exploded view of the elements of the appliance.
Figure 6:
Fig. 6 is a cross-section taken through one of the sponge cradles.
Figure 2:
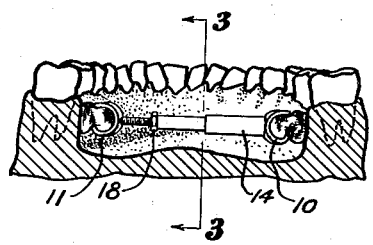
Fig. 2 is a cross-sectional view illustrating the location of the appliance relative to the gum line of the teeth of the lower jaw of the patient.
Figure 3:
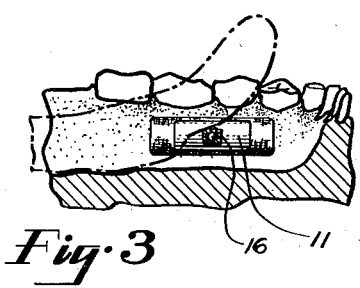
Fig. 3 is a cross-sectional view taken along a plane corresponding substantially to the line 3—3 of Fig. 2 and showing the location of the appliance relative to the tongue of the patient.

My invention contemplates a bilateral acting sponge applicator comprising generally a telescopic transverse strut having transversely disposed sponge cradles at the ends and resilient means acting on the strut elements to force the sponges compactly against the inner side of the gums of the patient's mouth with sufficient pressure to retain the sponges below and clear of the teeth and prevent any saliva from reaching any inner side cavities and tooth surfaces which have been conditioned for cementing or filling.

As shown in the drawings the appliance comprises right and left sponge cradle structures so shaped as to retain cotton sponges of substantially greater length than the length of the cradles. These cradle structures are formed preferably of a non-corroding metal and are of sufficient thickness to grip and retain the sponges when inserted therein. To further such retention centrally located lugs 12 may extend toward each other from the opposed margins of the cradle structure. Also I have found it desirable to have the inner cradle surfaces serrated or knurled to prevent relative turning movement between the sponge and cradle when the device is placed against the lower gums of the patient's mouth.

To provide the desired compressing function of the appliance, I have constructed the strut part of the appliance of a tubular extension 14 on one cradle 10 and which is rectangular in cross-section to receive a male part 16 adjustably associated with the other cradle 11. The male element 16 has a threaded bore to receive a screw extension 17 attached to the cradle 11. A lock nut 18 on the screw extension 17 is disposed to lock against the end of the male member 16 in any adjusted position of the member 16 relative to the cradle 11. A helical spring 20 is of such size as to fit within the tube 14 and abut against the wall of the cradle 10 when the member 16 is brought into assembled relation within the tube 14.

It will be noted that there is an inner shoulder 14a on one end of the tube 14 and a ridge or shoulder 16a on the end of the male member 16. These shoulders coact to prevent the spring 20 from separating the two telescoping members and the inner dimension of tube member 16 relative to the outer dimensions of member 16 are such that by tilting the member 16 relative to the tube end the shouldered end of the male member can be inserted past the shoulder 14a of the tube. The loose fit obviously present permits the cradle members and the sponges carried thereby to follow the inner-side gum lines and jaw contour of the patient.

It will be understood that the overall length of the assembled strut structure will be such that the spring can be compressed to contract the sponge cradles toward each other sufficiently for convenient mouth insertion and upon release within the mouth the telescopic members will continue to be acted upon by spring 20 and without shoulders 14a and 16a interfering with the spring action. By having two or three cradles 11 with threaded stems 17 of different lengths it will be apparent that the average, the exceptionally narrow and exceptionally wide lower jaw can be served.

In Fig. 7 I have shown an alternate construction wherein a keyway fills the function of the rectangularity of the two telescoping members above described. In this construction the cradles are pivotally attached to the strut structure for limited relative rocking movement for the purpose stated. The screw extension 24 is adjustable relative to the male sleeve 25. The male sleeve has a key 26 in the form of a transversely disposed pin, the ends of which slide in keyways 28 formed in the round tube member 29. In this construction the spring 20 serves the same purpose as above disclosed. Also, in Fig. 7 I have indicated still another modification wherein the strut mechanism is replaced by a unitary horseshoe shaped flat spring member 30 having stirrup or bifurcated ends 31 perforated to afford pivotal attachment to the sponge cradles. In this structure the flat spring member 30 is shaped to have the looped part thereof disposed along the given line of the lower front teeth.

While I have shown the sponge cradles 10 and 11 of such shape as to grip and support cotton roll sponges it is to be understood that the sponge pads may be of any practical shape suitable for the purposes hereinbefore stated.

In use the appliance is first adjusted by lengthening the overall effective length of the strut elements by screw adjustment of the elements 16 and 17 and they can be locked by tightening the lock nut 18 upon the adjacent end of the male member 16. Cotton sponges are then inserted in the cradles 10 and 11; the spring 20 is then further compressed by digit pressure on the sponges for insertion at the general positions indicated in the drawings. If desired one sponge carrying end may be positioned and the added compressing of the spring may then be effected to clear the other sponge of the gum line. The sponges, under the influence of the spring 20 will adjust to the gum contour by reason of the looseness or play purposely present between the two telescoped members 14, 16 and the spring is of such predetermined strength as to exert sufficient compressive force upon the sponges to maintain them in compressed relation to the gums and the floor muscles of the mouth beneath the tongue.

It will be seen that the tops and inner sides of the teeth are completely available for dental work on cavities located anywhere in the teeth and gum line cavities can be worked upon without obstruction to vision or instrument and the hazards of tongue and lingual muscle injury are greatly reduced. Also the appliance is such that the use of cheek sponges is not impeded. Another advantage of the instrument is found in the fact that any tooth surface which has been prepared for cementing preliminary to crown or bridge application is protected from saliva during this critically short period and during the cement setting period the region is kept dry by the sponges. I have found that in most cases the dental work referred to can be completed without the necessity of frequent sponge replacement.

I claim:
1. A bilateral lingual sponge applicator comprising two spaced-apart trough like sponge holders and connecting means linearly extending between the sponge holders, said means comprising a tubular slide member connected to one of the sponge holders, a stem member connected to the other sponge holder, an adjustable member on the stem member to change the effective length of said adjustable member and said stem member and adapted to telescope into the tubular member, a precompressed spring acting on the telescoped members and stop means for maintaining the telescoped members in telescoped relation against the expanding influence of the spring.

2. A bilateral lingual sponge applicator comprising two spaced-apart trough-like sponge holders, means connecting the sponge holders in the form of a tubular slide member connected to one of the sponge holders, a stem member connected to the other sponge holder, an adjustable member on the stem member and adapted to loosely telescope into the tubular member, a precompressed spring acting on the telescoped members, a longitudinal key slot in the tubular member and a key pin fixed to the adjustable member and operable in the slot to limit the relative turning movement of the telescoped members.

3. A bilateral lingual sponge applicator comprising two spaced-apart trough-like sponge holders and connecting means linearly extending between the sponge holders comprising a tubular slide member connected to one of the sponge holders, a screw member connected to the other sponge holder, an adjustable member engaging the screw member and adapted to telescope into the tubular member, a lock nut for locking the adjustable and the screw members in adjusted relation, a precompressed spring acting on the telescoped members and stop means for maintaining the telescoped members in telescoped relation against the expanding influence of the spring.

4. A bilateral lingual sponge applicator comprising two spaced-apart trough-like sponge holders, means connecting the sponge holders in the form of a tubular slide member connected to one of the sponge holders, a screw member connected to the other sponge holder, a longitudinally adjustable member on the screw member and adapted to loosely telescope into the tubular member, a lock nut for locking the screw member and the adjustable member together, a precompressed spring acting on the telescoped members, a longitudinal key slot in the tubular member and a key pin fixed to the adjustable member and operable in the slot to limit the relative turning movement of the telescoped members.

MONROE J. BUMP.

REFERENCES CITED

The following references are of record in the file of this patent:

UNITED STATES PATENTS

| Number | Name | Date |
| --- | --- | --- |
| 927,850 | Gartrell | July 13, 1909 |
| 999,373 | Kestler | Aug. 1, 1911 |
| 1,469,049 | Newman | Sept. 25, 1923 |

FOREIGN PATENTS

| Number | Country | Date |
| --- | --- | --- |
| 352,360 | Germany | April 25, 1922 |